March 19, 1935.  J. A. ZUBLIN  1,995,284
CUTTING EDGE FOR DRILLING TOOLS AND METHOD OF PRODUCING SAME
Original Filed Sept. 29, 1928
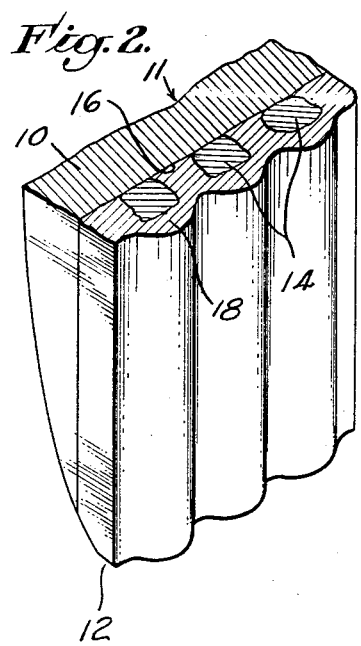
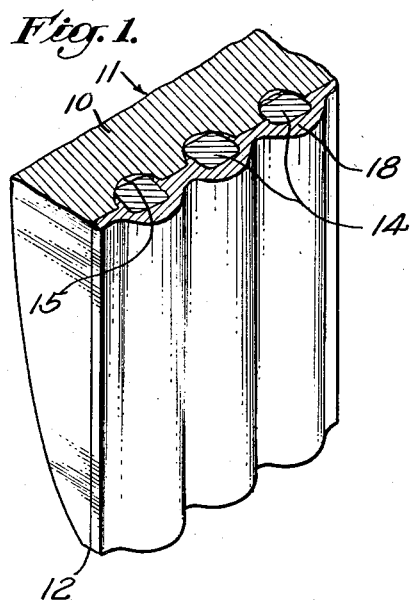
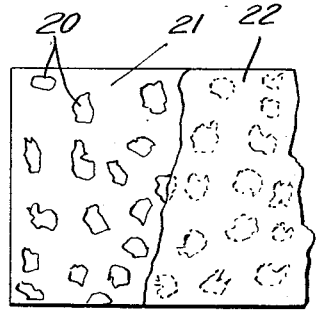
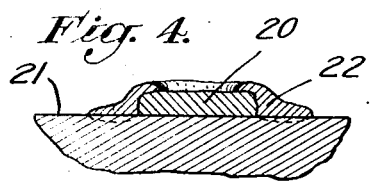
INVENTOR:
JOHN A. ZUBLIN,
By Ford W. Harris
ATTORNEY.

Patented Mar. 19, 1935

1,995,284

UNITED STATES PATENT OFFICE 1,995,284

CUTTING EDGE FOR DRILLING TOOLS AND METHOD OF PRODUCING SAME

John A. Zublin, Los Angeles, Calif., assignor of one-half to Caspar Leonid Zublin and one-half to Edward Adolphus Zublin, both of Los Angeles, Calif.

Original application September 29, 1928, Serial No. 309,248, now Patent No. 1,855,330. Divided and this application October 31, 1930, Serial No. 492,553

2 Claims. (Cl. 76—108)

This application is a division of my application Serial No. 309,248, filed September 29, 1928 since eventuated into Patent No. 1,855,330.

My invention relates to a cutting edge for drilling tool and method of producing same, and more-particularly to a method of securing one or more pieces of wear-resistant material to the cutting edge. My invention has a special utility on drill bits such as are used in the oil-well producing industry, and in such use constitutes a method of providing a drill bit with a novel cutting edge.

In view of the fact that my invention is quite useful in the oil-producing industry, my invention will be described as used on a well drilling bit. It should be understood, however, that the invention is of broader scope than this and may be used wherever a wear-resisting edge or surface is desired.

It is customary to drill oil-wells either by means of a rotary or a percussion system. The rotary method, however, has many advantages over the percussion method, but one disadvantage is found in the fact that the friction or scraping action on the cutting edge of the rotary bit soon wears away the cutting edge, particularly when drilling in hard formations.

My invention provides a cutting edge for a body, such as a bit, which will not wear away as rapidly as the ordinary cutting edges and will remain sharp for a longer period of time.

Certain metallic substitutes for diamond particles are now available on the market. These substitutes are extremely hard and have a very high melting temperature, and therefore do not melt appreciably under the flame of an oxyacetylene torch or an equivalent. In my invention particles of wear-resistant material, such as the diamond substitutes, are placed on the surface which is to be acted upon. Thereafter a supporting structure is welded to the surface in order to provide a cutting edge which consists of the welded supporting structure having the diamond substitutes embedded therein.

When the bit having a cutting edge of this character is utilized in the drilling of a well, the cutting edge comes into contact with the bottom of the well, and the welded material or supporting structure and the diamond substitutes come into contact with the surface being cut away and are worn away together as the drilling progresses, but at such different rates that the diamond substitutes, because of their greater hardness, protrude from the softer supporting structure of the bit. Thus the originally smooth cutting edge of the new bit becomes under drilling action a ragged cutting edge formed by the protruding diamond substitute metal pieces which maintain and improve the cutting efficiency of the tool until all diamond substitute pieces have been worn away by the abrading effect of the formation.

It is an object, therefore, of my present invention to provide a process in which the cutting edge of the tool is improved upon by applying by welding onto a supporting structure one or more pieces of diamond substitute metal, all of which constitutes the cutting edge of the body, adapted to be worn away at differential rates causing the diamond substitute metal pieces to protrude jointly or individually as sharp or tooth-like cutting edges which perform the work they are intended to perform.

Further objects and advantages of my invention will be pointed out in the following description in which reference is made to the accompanying drawing.

Referring to the accompanying drawing,—

Fig. 1 illustrates one method of attaching a plurality of wear-resistant sticks to the cutting edge of a drill bit.

Fig. 2 illustrates another method of accomplishing the same result.

Fig. 3 illustrates the wear-resistant pieces as being in small bodies, and being held in place by a continuous sheet of supporting material welded in place.

Fig. 4 is a sectional view illustrating another method of holding pieces of wear-resistant material in place.

Referring to the drawing in detail, in Fig. 1 I have illustrated a body 10, which is shown as comprising the extreme end of a tooth of a bit 11, this tooth having a cutting edge 12 adapted to be moved into contact with the strata to be penetrated by the bit. For the purpose of increasing the wearing qualities of the tooth, I provide a plurality of sticks 14 which, in the embodiment shown, extend toward the cutting edge 12. In the form illustrated in Fig. 1, each of these sticks is set in a groove 15, while in the form shown in Fig. 2 these sticks are in direct contact with a surface 16 of the body 10.

The sticks 14 are usually formed of a material having extremely good wear-resistant qualities. This material is almost invariably of the tungsten-carbide class and is ordinarily some form of metallic diamond substitute which is extremely hard and substantially unaffected by the temperature derived from an acetylene flame or from certain types of electrical welding apparatus.

One material I have found very useful in this capacity is known to the trade as "Borium" which may be secured either in the form of sticks or in small broken pieces.

To hold the sticks 14 in place, a body of supporting material 18 is welded to the surface 16, this supporting material at least partially surrounding the sticks in the embodiment shown in Figs. 1 and 2. The body 10 is ordinarily formed of steel, and it is desirable to have the supporting structure, formed by the supporting material 18, of the same material. In this capacity I have found it advantageous to utilize high carbon steel as a supporting material.

In Figs. 3 and 4 I illustrate methods of producing cutting edges conforming to my invention in which wear-resistant pieces 20 are secured to a body 21 by means of a supporting material 22 welded to this body. This supporting material may completely cover the pieces 20 in the form of a sheet, as indicated in Fig. 3, or may simply encase or surround a portion of the pieces 20, as illustrated in Fig. 4. In the different forms of my invention the wear-resistant material, whether they be in sticks or in relatively small pieces, are held in place by a body of welded material or by a welded supporting structure which is fused with the body 10 of Figs. 1 and 2 or with the body 21 of Figs. 3 and 4. The wear-resistant pieces are not substantially fused with the body or with the welded material, since their melting point is considerably higher than that of the body or welded material. The welded material, however, secures the pieces of tungsten carbide in place. The welded material may be ordinary carbon steel, low carbon nickel steel, high carbon steel, or other suitable steel or steel alloy, the material being capable of becoming welded to the material which may be used as a body.

I claim as my invention:

1. A method for improving the earth-penetrating and cutting qualities of a well-drilling tool initially having cutting edges of a metal possessing considerably less wear-resisting properties than metallic tungsten-carbide, comprising disposing over the operative earth-penetrating area of the cutting edges of the tool relatively small wear-resistant cutting elements of the metallic tungsten-carbide class, thereafter securing them in place by welded metal also possessing considerably less wear-resisting quality than said metallic tungsten-carbide elements, surrounding them at least partially with said welded metal, embedding and tenaciously gripping them in operative position, whereby in use said elements are caused to protrude beyond the softer metal cutting edge of the tool since the latter, under the abrasive action of the earthen formation, wears away faster than said abrasive-resistant metallic tungsten-carbide elements which, due to their sufficient tensile, compressive, and mechanical strength, continuously provide, despite the quick dulling of the metal cutting edges, new protruding sharp tungsten-carbide cutting edges which maintain easy penetration and quick removal of the earthen formations throughout the wearing away of the operative portion of the cutting edges of the drilling tool.

2. In combination with a well-drilling tool, comprising a cutting edge of metal possessing considerably less wear-resisting properties than metallic tungsten-carbide, a plurality of wear-resistant elements of the metallic tungsten-carbide class embedded in the operative area of said cutting edges and tenaciously held therein by welded metal at least partially surrounding said wear-resistant metallic tungsten-carbide elements, said welded metal also possessing considerably less wear-resisting properties than said metallic tungsten-carbide elements whereby, in use of said tool to penetrate earthen formations, said metallic tungsten-carbide elements protrude beyond the softer metal of the cutting edge as the latter wears away under the abrasive action of the earthen formation faster than do the tungsten-carbide elements which possess a degree of tensile, compressive, and mechanical strength adequate to continuously provide, as the metal of the cutting edge of the tool dulls during operation, new protruding sharp tungsten-carbide cutting elements.

JOHN A. ZUBLIN.